(12) United States Patent
Washburn et al.

(10) Patent No.: US 10,820,515 B2
(45) Date of Patent: Nov. 3, 2020

(54) COMBINE HEADER WITH FEED ASSIST BULKY CROP AUGER ON A DRAPER PLATFORM

(71) Applicant: DEERE & COMPANY, Moline, IL (US)

(72) Inventors: Anthony J. Washburn, Orion, IL (US); Bryan R. Yanke, Moline, IL (US); Duane M. Bomleny, Moline, IL (US)

(73) Assignee: DEERE & COMPANY, Moline, IL (US)

( * ) Notice: Subject to any disclaimer, the term of this patent is extended or adjusted under 35 U.S.C. 154(b) by 231 days.

(21) Appl. No.: 16/127,335

(22) Filed: Sep. 11, 2018

(65) Prior Publication Data
US 2020/0000037 A1     Jan. 2, 2020

Related U.S. Application Data

(60) Provisional application No. 62/691,357, filed on Jun. 28, 2018.

(51) Int. Cl.
*A01D 61/00*     (2006.01)
*A01D 43/06*     (2006.01)
*A01D 57/20*     (2006.01)

(52) U.S. Cl.
CPC ........... *A01D 61/008* (2013.01); *A01D 43/06* (2013.01); *A01D 57/20* (2013.01); *A01D 61/004* (2013.01)

(58) Field of Classification Search
CPC ...... A01D 61/008; A01D 43/06; A01D 57/20; A01D 61/004; A01D 41/14; A01D 61/002
See application file for complete search history.

(56) References Cited

U.S. PATENT DOCUMENTS

| | | | |
|---|---|---|---|
| 2,455,905 A | * | 12/1948 | Ronning ............. A01D 61/008 56/124 |
| 2,491,739 A | | 12/1949 | LaDow |
| 2,748,921 A | | 6/1956 | White |

(Continued)

FOREIGN PATENT DOCUMENTS

| | | |
|---|---|---|
| EP | 2422607 A1 | 2/2012 |
| EP | 3064053 A1 | 9/2016 |
| GB | 891442 A | 3/1962 |

OTHER PUBLICATIONS

European Search Report issued in counterpart European Patent Application No. 19182194.1 dated Oct. 28, 2019 (7 pages).

*Primary Examiner* — Arpad Fabian-Kovacs
(74) *Attorney, Agent, or Firm* — Taft Stettinius & Hollister LLP; Stephen F. Rost (57) ABSTRACT

A harvesting assembly for harvesting a crop including a cutting knife configured to provide cut crop and a draper platform including a first side draper and a second side draper. A crop auger assembly includes a first auger disposed at the first side draper and a second auger disposed at the second side draper, wherein the first auger and the second auger each include a cylinder having a surface, a flight extending from the surface, and a plurality of fingers extending from the surface and beyond an exposed edge of the flight, wherein the crop auger rotates about an auger axis. A feed drum is disposed at a center draper wherein the feed drum includes a plurality of fingers.

17 Claims, 8 Drawing Sheets

(56) References Cited

U.S. PATENT DOCUMENTS

| | | | |
|---|---|---|---|
| 3,023,560 A * | 3/1962 | Krahn | A01D 61/008 56/14.4 |
| 3,094,829 A | 6/1963 | Claas | |
| 4,214,425 A * | 7/1980 | Schmitt | A01D 41/04 56/228 |
| 5,620,083 A | 4/1997 | Vogelgesang | |
| 6,640,527 B2 * | 11/2003 | Farley | A01D 61/008 56/12.4 |
| 6,668,534 B2 | 12/2003 | Sheedy et al. | |
| 7,971,420 B1 * | 7/2011 | Bollin | A01D 41/145 56/208 |
| 8,166,738 B1 | 5/2012 | Coers et al. | |
| 10,212,885 B2 * | 2/2019 | Mossman | A01D 34/04 |
| 10,477,767 B2 * | 11/2019 | Modak | A01D 61/004 |
| 2003/0110750 A1 | 6/2003 | Farley et al. | |
| 2008/0098705 A1 * | 5/2008 | Salley | A01D 41/06 56/16.4 R |
| 2008/0295474 A1 | 12/2008 | Tippery et al. | |
| 2009/0050447 A1 * | 2/2009 | Eagles | A01D 61/002 198/625 |
| 2009/0056298 A1 | 3/2009 | Lohrentz et al. | |
| 2009/0217639 A1 * | 9/2009 | Lohrentz | A01D 61/004 56/364 |
| 2010/0212277 A1 * | 8/2010 | Marrs | A01D 61/004 56/12.4 |
| 2014/0237978 A1 * | 8/2014 | Washburn | A01D 61/006 56/181 |
| 2016/0057932 A1 * | 3/2016 | Mossman | A01D 57/00 198/860.1 |
| 2017/0094899 A1 | 4/2017 | Webermann et al. | |
| 2017/0208738 A1 * | 7/2017 | McCrea | A01D 34/14 |
| 2018/0054964 A1 * | 3/2018 | Fuchtling | A01D 61/02 |
| 2018/0084724 A1 | 3/2018 | Fuchtling | |
| 2019/0000013 A1 * | 1/2019 | Sorensen | A01D 61/008 |
| 2019/0029181 A1 * | 1/2019 | Modak | A01D 67/00 |
| 2019/0200525 A1 * | 7/2019 | MacMillan | A01D 41/12 |
| 2019/0313581 A1 * | 10/2019 | Sorensen | A01D 61/008 |

\* cited by examiner

COMBINE HEADER WITH FEED ASSIST BULKY CROP AUGER ON A DRAPER PLATFORM

CROSS-REFERENCE TO RELATED APPLICATION

This application claims priority to Provisional Patent Application Ser. No. 62/691,357, having the title "Combine Header with Feed Assist Bulky Crop Auger on a Draper Platform" filed Jun. 28, 2018, the disclosure of which is incorporated herein by reference in its entirety.

FIELD OF THE DISCLOSURE

The present disclosure relates to a combine harvester, and more particularly, to a combine header for a combine harvester, wherein the combine header includes a bulky crop top auger on a draper platform.

BACKGROUND

Agricultural machines, such as a combine harvester, include different portions or sections for cutting crop and moving the crop through the harvester. A header for an agricultural combine harvester is arranged to be moved in a forward direction over a field. The header comprises a laterally extending frame supporting a laterally extending cutter bar. Laterally extending and generally vertical back sheets are disposed along the back of the header on left and right sides of the header. The back sheets have a central aperture therebetween. Left and right lateral belt conveyors, also called left and right draper belt conveyors, are supported on the frame. Each of the draper conveyers includes a draper belt having a feeding direction from an outer side end towards a center of the header. A central conveyor, also called a center draper belt conveyor, is disposed between the inner ends of the left and right draper belt conveyors to receive cut crop material and convey it rearward through the central aperture. Rotationally drivable left and right crop rollers are supported on the frame forward of the back sheets and above the left and right draper belt conveyors. The crop rollers extend substantially over the length of the left and right draper belt conveyors and have a laterally extending rotational axis and a smooth cylindrical surface with a circular cross section.

A centrally located drum is located above the central draper belt conveyor to move the cut crop that is collected and directed to the central aperture. Certain types of crops, once cut, are not effectively moved from the center draper conveyor by the central top drum. While some of the cut crop moves through the central aperture, a percentage of the cut crop is compressed by the central drum and builds up before or at the aperture. This build up either slows down the cut crop moving through the aperture or builds up to such an extent that the flow of cut crop is stopped. What is needed therefore is a draper platform to reduce or eliminate the buildup of a bulky cut crop.

SUMMARY

In one embodiment of the present disclosure there is provided a harvesting assembly for harvesting a crop including a cutting knife configured to provide cut crop and a draper platform including a first side draper, a second side draper, and a center draper disposed between the first side draper and the second side draper. The first and second side draper each include a draper belt having a front edge and rear edge, the front edge located closest to the cutting knife. A crop auger assembly includes a first auger disposed at the first side draper and a second auger disposed at the second side draper, wherein each of the first auger and the second auger include a cylinder having a surface, a flight extending from the surface, and a plurality of fingers extending from the surface and beyond an exposed edge of the flight, wherein the crop auger assembly rotates about an auger axis. A feed drum is disposed at the center draper and includes a plurality of fingers, wherein the feed drum rotates about a drum axis.

In another embodiment, there is provided a harvesting assembly for harvesting a crop including a belted platform having a first side belt and a center belt, the first side belt and the center belt each having a front edge and rear edge. A first crop auger is disposed at the first side belt, wherein the first crop auger includes a cylinder having a surface, a flight extending from the surface, and a plurality of auger fingers extending from the surface. The first crop auger is configured to rotate about an axis. A feed drum is disposed at the center belt, the feed drum including a plurality of fingers, wherein the feed drum rotates about a drum axis.

In a further embodiment, a draper header for harvesting a crop includes a cutting knife configured to cut crop and a draper platform including a first side draper, a second side draper, and a center draper disposed between the first side draper and the second side draper. The first and second side draper each include a draper belt having a front edge and rear edge, wherein the front edge is located closest to the cutting knife. A crop auger assembly includes a first auger disposed at the first side draper and a second auger disposed at the second side draper, wherein each of the first auger and the second auger includes a cylinder having a surface, a flight extending from the surface, and a plurality of fingers extending from the surface, wherein the crop auger rotates about an auger axis. A feed drum is disposed at the center draper. The feed drum includes a plurality of fingers, wherein the feed drum rotates about a drum axis.

In an additional embodiment, there is provided a method of harvesting a crop with a draper header having a side draper and a center draper disposed adjacently to the side draper. The method includes: providing a crop auger having an axis of rotation, the crop auger disposed above the side draper, the crop auger including a flight spirally located about a cylinder, the flight having a leading edge, and a plurality of fingers extending from the cylinder; providing a feed drum disposed above the center draper and having an end overlapping an end of the crop auger; extending the fingers during rotation of the crop auger about the axis of rotation to compress the harvested crop located on the side draper; and moving the compressed crop to the center draper with the side draper.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

For the purposes of promoting an understanding of the principles of the present disclosure, reference will now be made to the embodiments described herein and illustrated in the drawings and specific language will be used to describe the same. It will nevertheless be understood that no limitation of the scope of the present disclosure is thereby intended, such alterations and further modifications in the illustrated devices and methods, and such further applications of the principles of the present disclosure as illustrated therein being contemplated as would normally occur to one skilled in the art to which the present disclosure relates.

Figure 1:
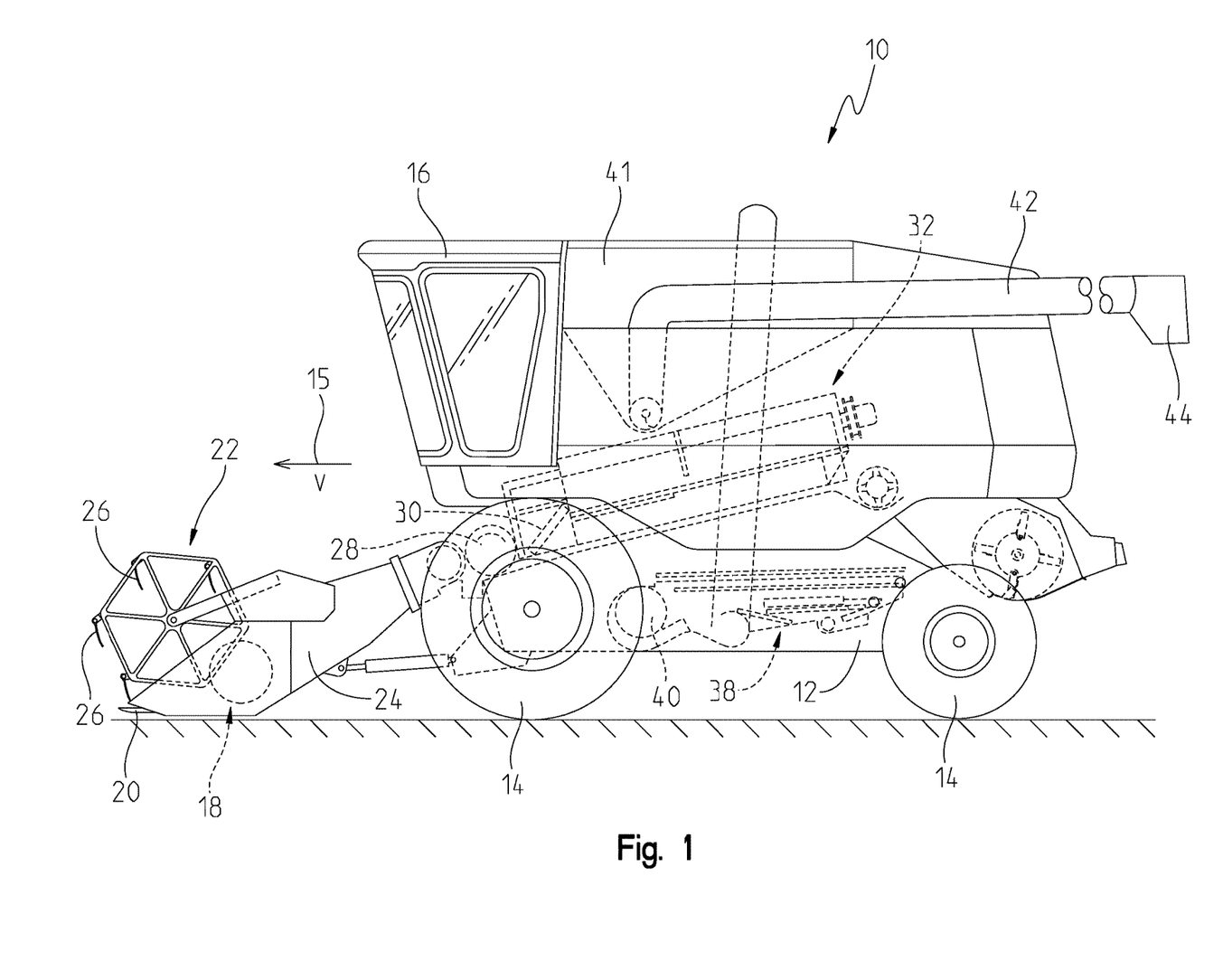
FIG. 1 is an elevational side view of an agricultural combine harvester.

FIG. 1 illustrates one embodiment of an agricultural combine harvester 10 including a chassis 12 with wheels 14 in contact with the ground. Wheels 14 are coupled to the chassis 12 and are used for propulsion of the combine 10 in a forward operating or travelling direction 15. The operation of the combine 10 is controlled from an operator's cab 16. The operator's cab 16, in different embodiments, includes one or more controls (not shown) for controlling the operation of the harvester 10. A draper header 18 is disposed at a forward end of the harvester 10 and includes a cutting knife or cutterbar 20 to cut crop being harvested. The cut crop includes any variety and types of different crops including wheat, soybeans, sorghum, barley, and other grains. At substantially the same time the grain is cut, a pickup reel assembly 22, rotates as understood by those skilled in the art, to move or force the cut crop toward a slope conveyor 24. The pickup reel assembly 22 includes a plurality of fingers 26. The fingers 26 lift and move the cut crop over the cutterbar 20, as well as to comb through the cut crop to provide a degree of separation of the crop. The cut crop is conducted by a guide drum 28 and directed by the slope conveyor 24 to an inlet transition section 30. The inlet transition section 30 directs the cut crop to an axial harvested crop processing arrangement 32.

The crop processing arrangement 32 includes, in one or more embodiments, a rotor housing, a rotor including a hollow drum, a charging section, a threshing section, and a separating section, as is understood by those skilled in the art. A conveyor receives grain from the crop processing arrangement 32 and moves the grain to an outlet of the conveyor where it is deposited in a collection vehicle, such as a grain wagon.

Grain and chaff that fall through the crop processing arrangement may be directed to a cleaning system 38 with a blower 40. The cleaning system 38 removes the chaff and guides the clean grain to an elevator for clean grain (not shown). The elevator deposits the clean corn in a tank 41 that is unloaded by a conveyor 42 having an outlet 44 to a wagon, trailer, or truck (not shown).

Figure 2:
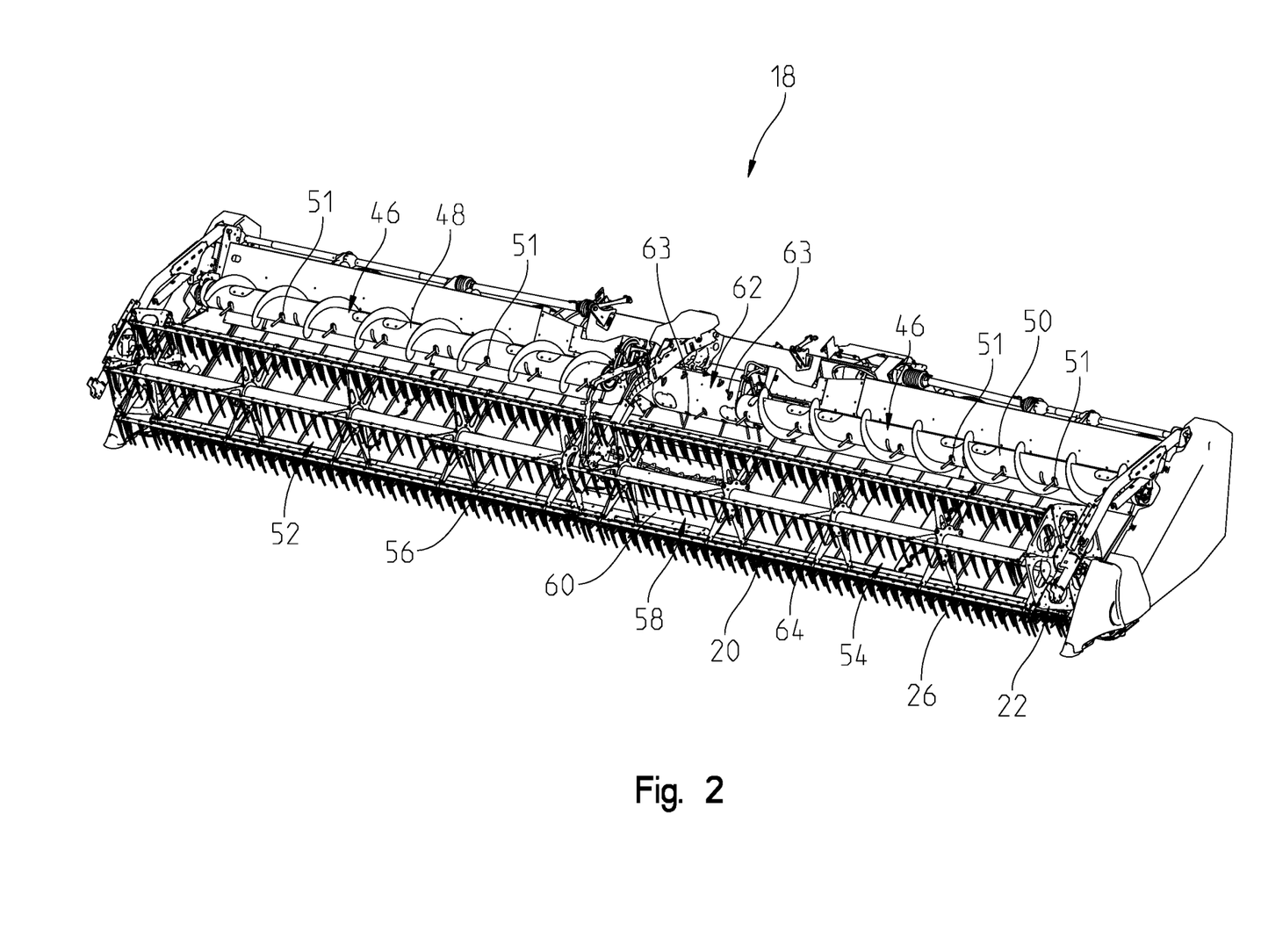
FIG. 2 is a perspective view of a draper header.

As further illustrated in FIG. 2, the draper header 18 includes a crop auger assembly 46 including a first auger 48 and a second auger 50. The first auger 48 is disposed over a first side draper 52 and the second auger 50 is disposed over the second side draper 54. Each of the crop augers 48 and 50 include a plurality of retractable and extending fingers 51. The first side draper 52 includes a belt 56 supported by rollers that moves a top surface of the belt 56 toward a center draper 58. The center draper 58 includes a belt 60 that moves the surface of the belt toward a centrally located feed drum 62. The feed drum 62 includes retractable fingers 63. The second side draper 54 includes a belt 64 supported by rollers that moves the top surface of the belt 64 toward the center draper 58.

As the draper header 18 moves forward to cut crop, the pickup reel assembly 22, with the action of the fingers 26, aids in picking up crop cut by the cutter bar 20 to locate the cut crop on the left side draper belt 56, the center draper belt 60, and the right side draper belt 64. The cut crop located on the draper belts 56 and 64 is moved toward the center draper belt 60 and toward the feed drum 62. In addition, cut crop is moved by the left auger 48 and the right auger 50 toward the center draper belt 60. In one embodiment, the draper header 18 includes a rigid frame such that the entire length of the header is rigidly supported. In another embodiment, the header frame is not a rigid frame, but is instead a flexible frame or a hinged frame. In one embodiment of hinged frame, each of the first auger 48 and the second auger 50 are coupled to a separate frames hinged at or near the center draper assembly.

Figure 3:
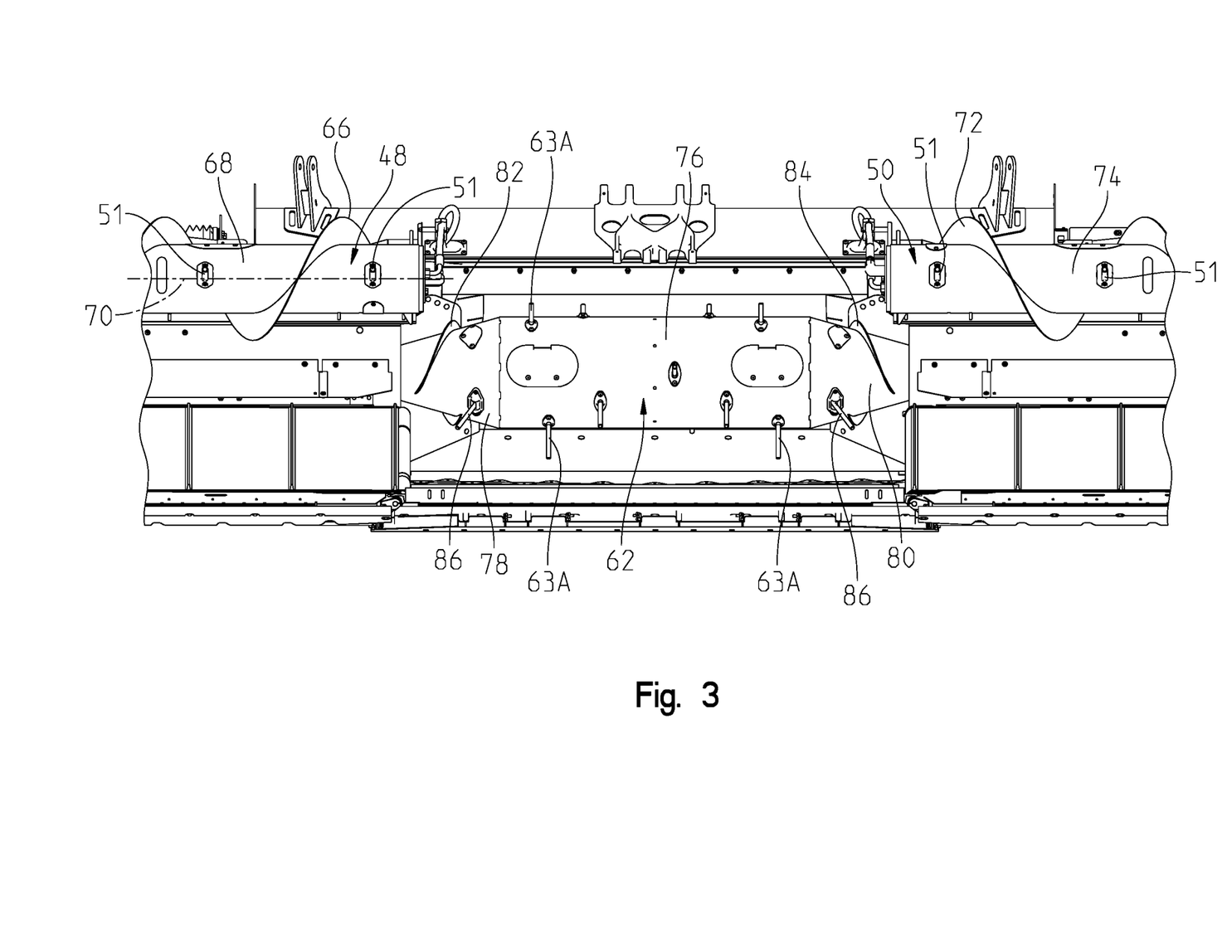
FIG. 3 is front view of a central portion of a draper header.
Figure 4:
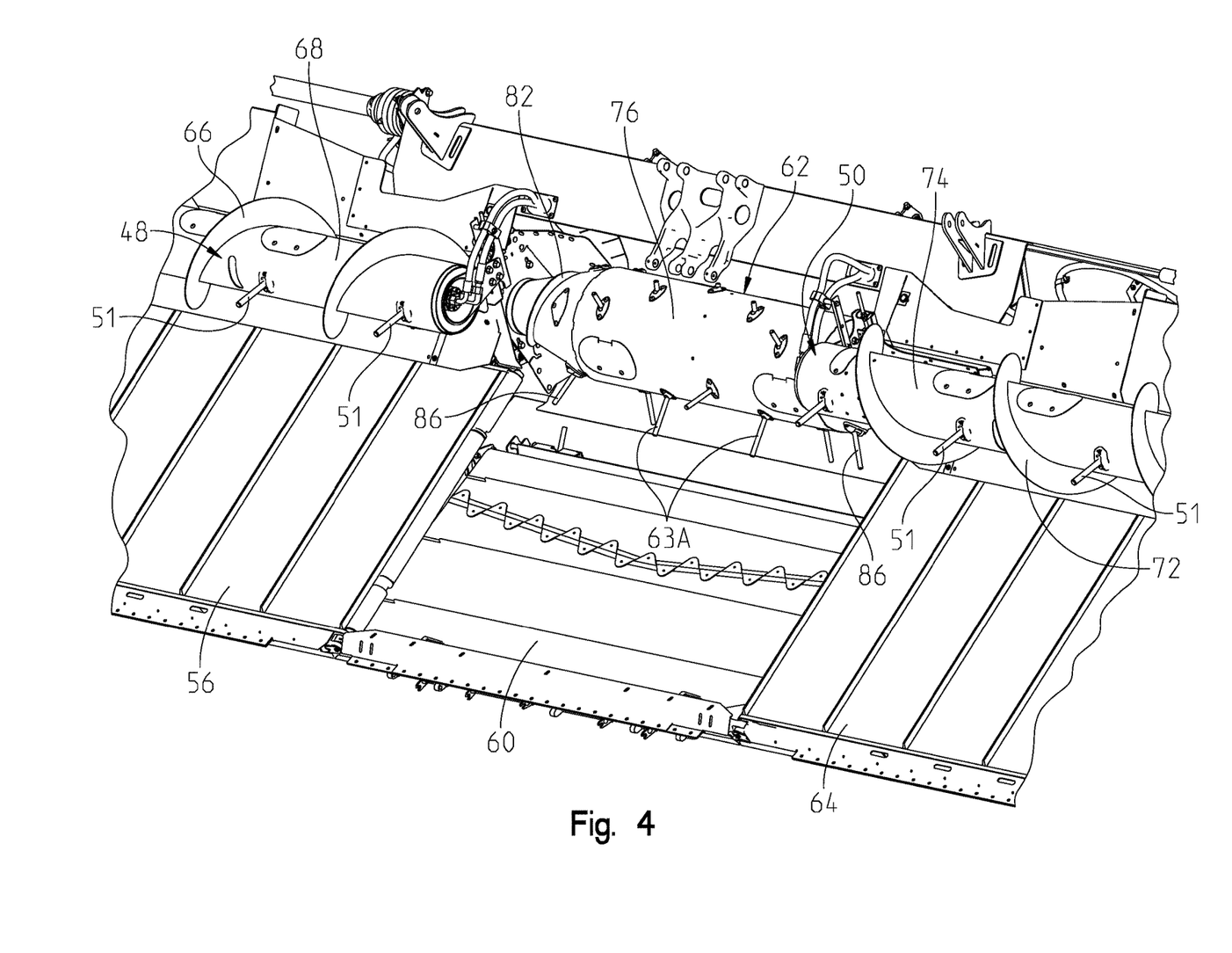
FIG. 4 is a perspective view of a central portion of a draper header.

FIG. 3 illustrates a front view of a central portion of the draper header 18 and FIG. 4, illustrates a perspective view of the central portion of the draper header 18. The first auger 48 includes a vane or flight 66 which is spirally located about a cylinder 68 that extends along the left side draper belt 56. The plurality of fingers 51 extend from and retract into the cylinder 51. In one embodiment, the fingers 51 when fully extended are located along a longitudinal line 70 along the length of the first auger 48. In another embodiment, the fingers 51 are staggered about the longitudinal line 70. The vane 66 circumscribes the outer surface of the cylinder 68 such that a single finger 51 is located between one 360 degree turn of the vane 66 about the cylinder 68. In other embodiments, two or more fingers 51 are located between one 360 degree turn of the vane about the cylinder 68. In one or more embodiment, the fingers 51 are located along the longitudinal line 70 or are staggered along and about the longitudinal line 70. In other embodiments, two or more fingers 51 are located between one 360 degree turn of vane 72.

The second auger 50 includes a vane 72 which is spirally located about a cylinder 74 that extends along the right side draper belt 64. The fingers 51 extend from the cylinder 74 and are located either along a longitudinal line of the cylinder 74 or are staggered about the longitudinal line. In addition, one or more fingers 51 are located between one 360 degree turn of vane 72.

The feed drum 62 extends between ends of the first auger 48 and the second auger 50 when viewed from the elevational front view of FIG. 3. The feed drum 62 includes a centrally located cylinder 76, a first conically shaped portion 78 located at one end of the cylinder 76, and a second conically shaped portion 80 located at another end of the cylinder 76. The smaller ends of each of the portions 78 and 80, in one embodiment, are supported by a driven shaft that rotates the drum 62. A first vane 82 circumscribes the first portion 78 and a second vane 84 circumscribes the second portion 80. In the illustrated embodiment, the cylinder 76 lacks a vane.

A plurality of fingers 63A extends from the centrally located portion 76 and are staggered about the portion 76 such that two of the fingers 63A are aligned along different longitudinally extending lines of the portion 76. In addition, the fingers 63A are located along different diameters circumscribing the surface of the portion 76. In one embodiment, one finger 63A is aligned about a single surface diameter. In other embodiments, two or more fingers 63A are aligned about a single surface diameter. Each of the fingers 63A includes a longitudinal axis being substantially perpendicular to a longitudinal axis of the portion 76.

One or more fingers 86 extend from surfaces of the conically shaped portion 78 and 80. The fingers 86 extend from the conically oriented surface such that a longitudinal axis of the finger 86 is inclined with respect to the longitudinal axis of the portion 76. In different embodiments, the fingers 63 and 86 are fixed or retractable/extendable.

Figure 5:
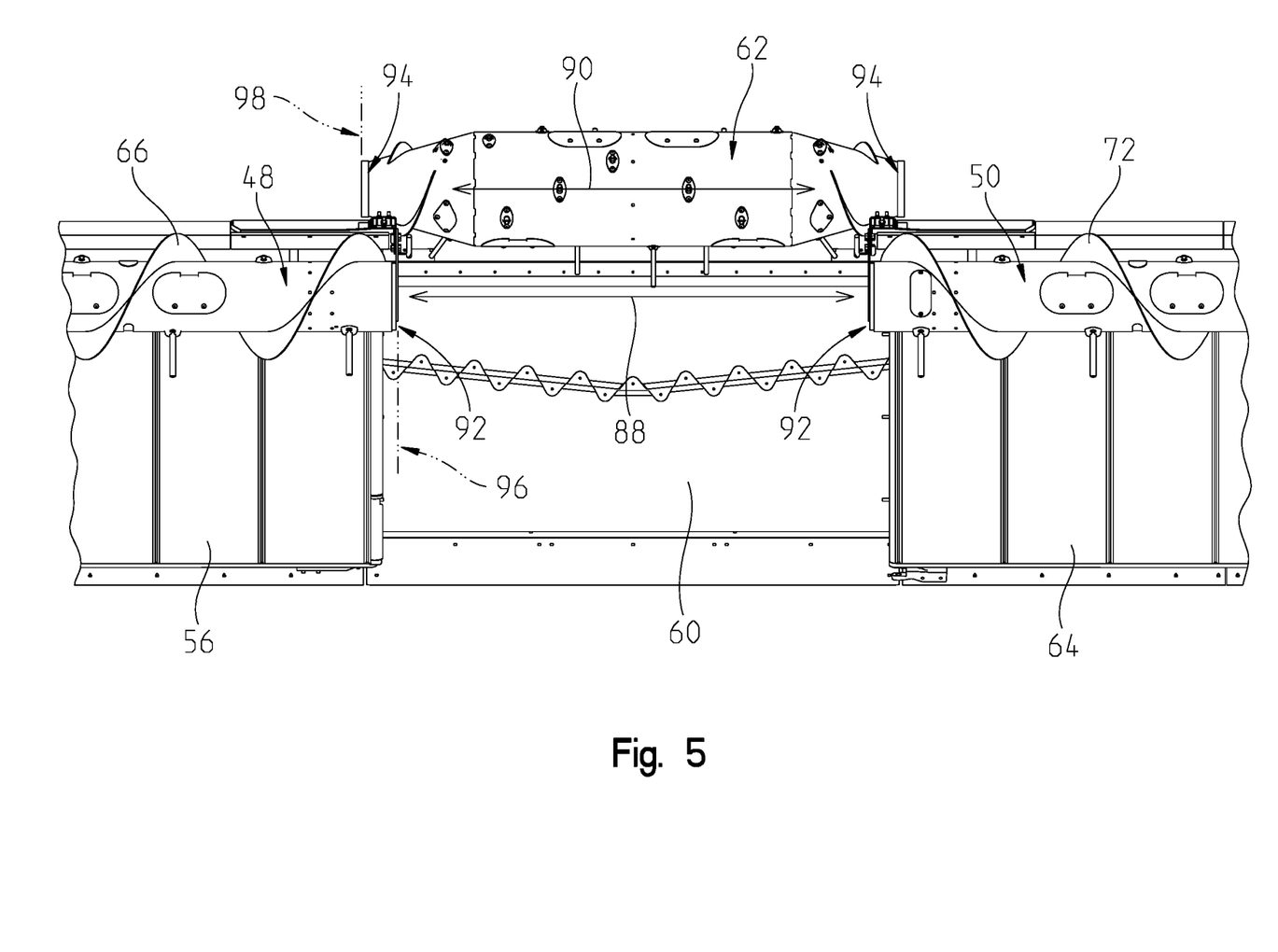
FIG. 5 is a top view of central portion of a draper header.

FIG. 5 illustrates a top view of the central portion of the draper header 18. Each of the first and second augers 48 and 50 rotate about and are aligned about a first rotational axis 88. The drum 62, illustrated in outline, rotates about and is aligned with a second rotational axis 90. The second rotational axis 90 is located rearward of the first rotational axis 88, such that cut crop moved by the vanes 66 and 72 toward the center draper belt, is collected on the center draper belt, and subsequently moved toward the drum 62. Rotation of the drum 62 in combination with movement of the belt 60 moves the cut crop from the draper header 18 to the cut crop collector. As can be seen in FIG. 3, the elevation of the augers 48 and 50 is higher than the elevation of the drum 62.

The top view of the center portion of the header 18 of FIG. 5 illustrates that ends 92 of the augers 48 and 50 extend past ends 94 of the drum 62. A line 96 denotes the end of the auger 48 and a line 98 denotes an end of the drum 62. Cut crop delivered to the center draper belt 60 at the end auger 48 which moves the cut crop to the drum 62 where the fingers 86 and the fingers 63A engage the crop with the belt 60.

Figure 6:
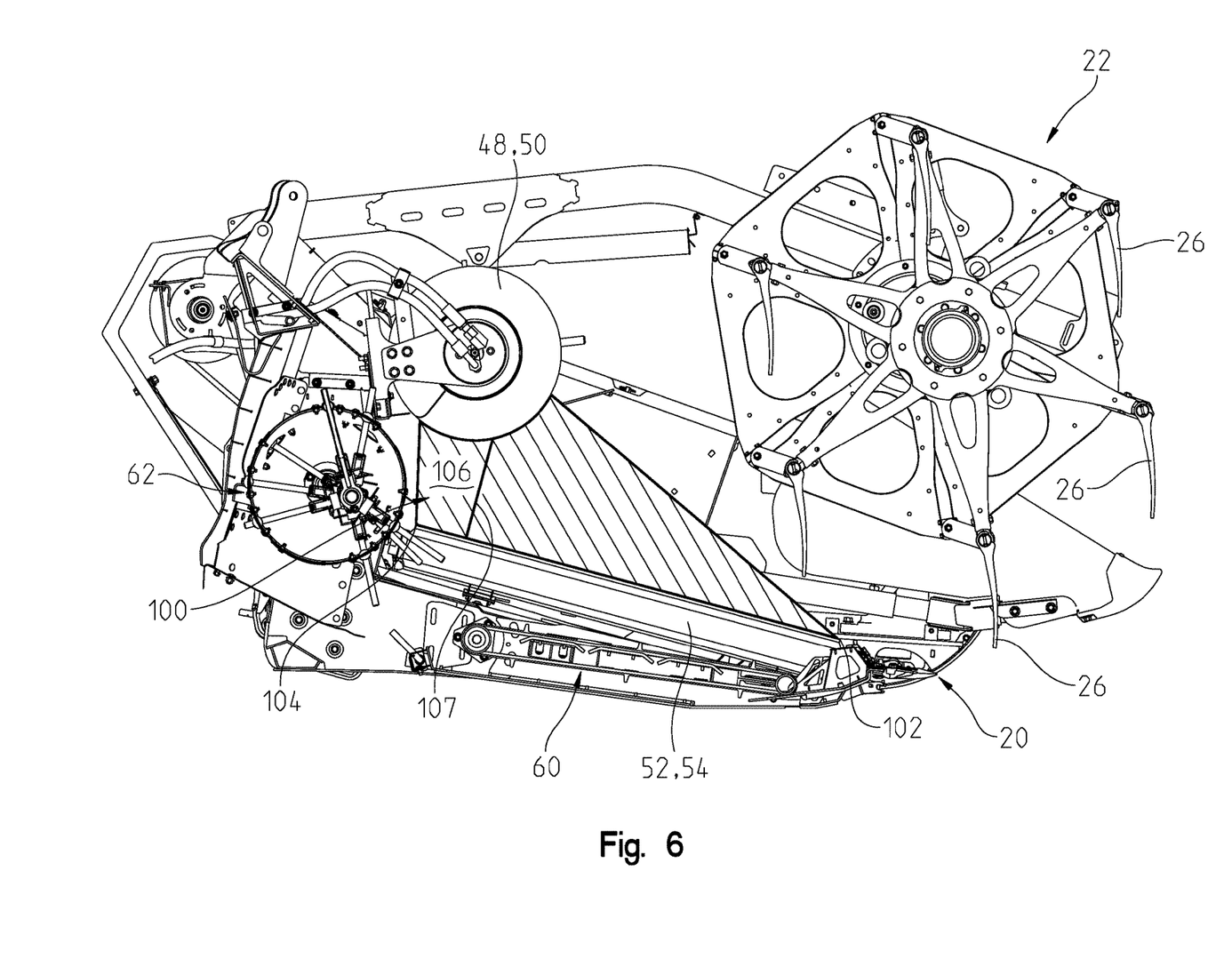
FIG. 6 a representational view taken from a side of a draper header.

FIG. 6 is a representational view of a side of the draper header 18 to illustrate a cut crop collection zone 100 provided by the fingered augers 48, 50 in combination with the fingered drum 62. Fingers of the auger 48 and 50 are not shown in this figure for purposes of illustrating principles of operation. A collection zone 100, shown by angled lines, extends from leading edges 102 of the draper belts to rear edges 104 of the draper belts. As crop builds up on the belts, the amount of crop located between the leading edges 102 and the rear edges 104 increases and extends upwardly toward the augers 48 and 50. Since the augers 48 and 50 include fingers, an area 106 located beneath the augers 48 and 50 (shown by a line 107) and forward of the drum 62 is substantially or fully utilized for processing the cut crop. The outline of area 106 indicates a general boundary of this area, but in actual practice the area 106 is not rigidly defined. By having augers 48 and 50 with fingers, the area 106 is fully utilized.

The cut crop is moved or pulled toward the rear of the draper header 18 as well being compressed in the area 106 to more completely utilize the volume or space located beneath augers 48 and 50. With the more complete utilization of volume generally indicated at area 106, the draper header 18 operates move efficiently. In particular, header output is increased and maintenance downtime is reduced, since clogging of the header is reduced or eliminated.

Figure 7:
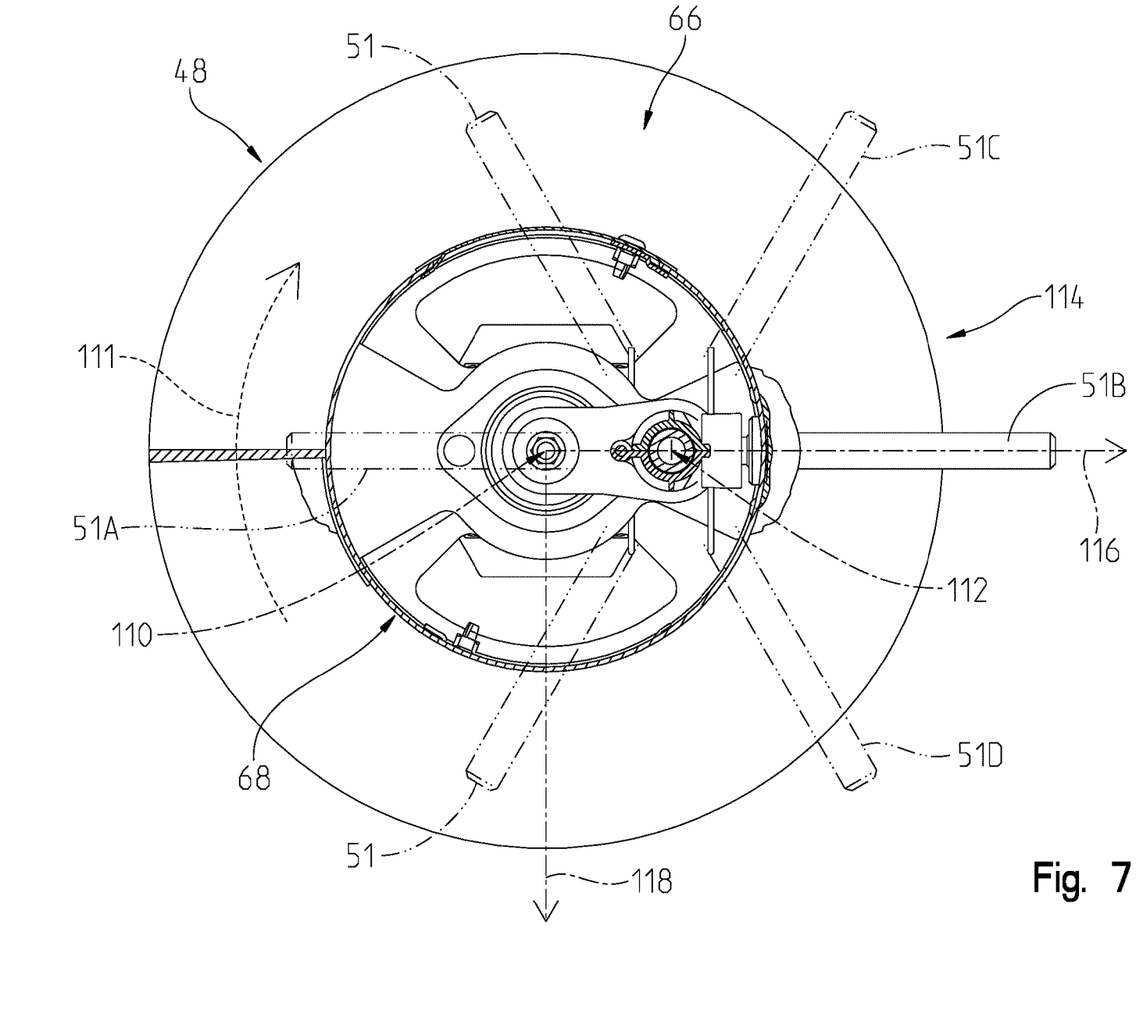
FIG. 7 is a cross-sectional view of an auger.

FIG. 7 illustrates a cross sectional view of one the top auger 48. Auger 50 is similarly configured. The vane 66 extends from the cylinder 68 which rotates about an axis of rotation 110. A direction of rotation 111 is in a clockwise direction as illustrated. The auger 48 of FIG. 6 rotates in the same direction as illustrated in FIG. 6 such that the cut crop is driven toward the draper belts by the fingers. Each of the fingers 51 rotates about an axis of rotation 112, such that as the cylinder 68 rotates, the fingers 51 extend from the surface of the cylinder 68 and retract into an interior of the cylinder 68. For instance, finger 51A is substantially retracted into the cylinder. As the cylinder 68 rotates, the fingers extend and retract from the cylinder 68 such that the greatest extension occurs towards the front of the header 18.

In one embodiment having a single row of fingers such as is illustrated in FIG. 4, fingers 51A, 51B, 51C, and 51D illustrate a single one of the fingers 51 in the row or fingers at various states of extension and retraction during rotation of the auger 48 along the direction of rotation 111. In other embodiments having a number of finger 51 staggered about the longitudinal axis 70 of FIG. 3, the fingers 51A, 51B, 51C, and 51D illustrate different fingers at different states of extension and retraction during rotation of the auger 48 along the direction of rotation 111.

Finger 51B extends from the surface of the cylinder 68 and past a leading edge 114 of the vane 66. Fingers 51C and 51D also extend past the leading edge 114 but do not extend as far as does the finger 51B. Since each of these fingers extends past the vane 66 and are oriented toward the leading edge 102, the extended fingers positively engage and compress the cut crop as the cut crop moves towards the trailing edge 104. While the finger 51B is shown as extending the furthest along plane generally parallel to a ground plane provided by the ground being cultivated, in other embodiments, the furthest extending finger is oriented with respect to the ground plane in other directions. For instance, in different embodiments, the furthest finger extension occurs about a 90 degree arc between dotted lines 116 and 118. As the cylinder 68 rotates, the fingers extend into the cut crop that is collected below the augers and push the cut crop toward the drum 62. By extending into the cut crop at this location, the extended fingers grab and compress the cut crop over the center belt 60 for improved transport of crop to the collector. Other locations or maximum extension of the fingers are contemplated. In different embodiments, the fingers are fixed or retractable/extendable. The extension and engagement of the cut crop over the center belt reduces the impact of shatter loss.

Figure 8:
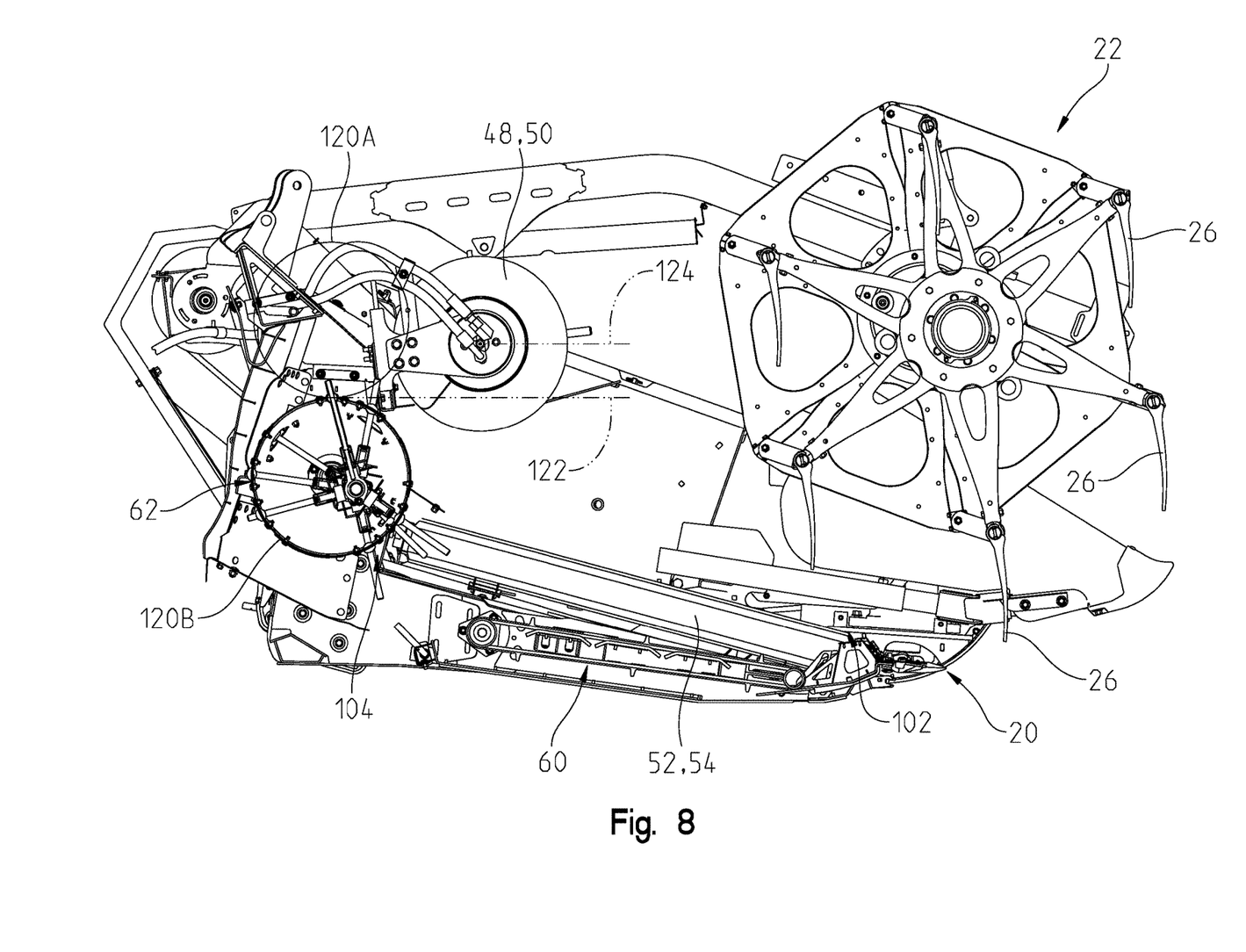
FIG. 8 is a representational view taken from a side of a draper header.

FIG. 8 is a representation of a side of the draper header 18 to illustrate configuration of the augers 48 and 50 and the drum 62. The diameter of the augers 48 and 50 at the leading edge of the vanes have been drawn as a diameters 120A and 120B at two different locations. A tangent line 122 is drawn to illustrate a top tangent surface of the feed drum 62. A center axis line 124 is drawn to illustrate an axis extending through an axis of rotation of the augers 48 and 50.

The positional relationship between the augers and the drum determines the feeding effectiveness of the cut crop collector. If the auger is too high or too low relative to the drum, feeding issues can develop. For instance, if the augers 48 and 50 are raised directly upward, from the illustrated position, such that the vane of the augers is located at the tangent line 122, the effectiveness of crop feeding is reduced. The diameter 120A illustrates an elevated position of the augers 48 and 50, but is not intended to indicate a more rearward location of the augers, as such a location would provide little or no compression of cut crop. In one embodiment, the lower surface of the top auger, as defined by the leading edge 114 of the vane 66, is spaced from the surface of the drum by no more than one time the diameter of the top auger 48 or top auger 50. Consequently, the lower surface of the top auger is within one times the top auger diameter of the top tangent surface of the feed drum.

While exemplary embodiments incorporating the principles of the present disclosure have been described herein, the present disclosure is not limited to such embodiments. Instead, this application is intended to cover any variations, uses, or adaptations of the disclosure using its general principles. Further, this application is intended to cover such departures from the present disclosure as come within known or customary practice in the art to which this disclosure pertains.

The invention claimed is:

1. A harvesting assembly for harvesting a crop comprising:
   a cutter bar
   a belted platform including a first side belt and a center belt, the first side belt and the center belt each having a front edge and rear edge, wherein the first side belt moves along a longitudinal direction toward the center belt and the center belt moves generally perpendicular to the longitudinal direction;
   a first side crop auger disposed along the longitudinal direction above the first side belt, wherein the first side crop auger includes a cylinder having a surface, the cylinder rotating about an auger axis disposed along the longitudinal direction, a flight extending from the surface, and a plurality of auger fingers, wherein each of the plurality of auger fingers extends from the surface to a maximum extended position and retracts from the surface to a retracted position during rotation of the cylinder, and wherein the maximum extended position of each of the plurality of auger fingers occurs at a predetermined degree of rotation of the first side crop auger, wherein the predetermined degree of rotation is located between a horizontal plane and a vertical plane of the harvesting assembly; and
   a feed drum disposed at the center belt, the feed drum including a plurality of fingers, wherein the feed drum rotates about a drum axis above the center belt.

2. The harvesting assembly of claim 1 wherein the plurality of auger fingers extend through the surface from the retracted position to the maximum extended position and are configured to compress the harvested crop located on the first side belt and to move the compressed crop toward the rear edge of the first side belt.

3. The harvesting assembly of claim 2 wherein the first side crop auger defines a lower surface and an auger diameter, and the feed drum defines a top tangent surface, wherein the lower surface of the first side crop auger is located to be within one times the auger diameter with respect to the tangent surface of the feed drum.

4. The harvesting assembly of claim 1 wherein the predetermined degree of rotation is 90 degree arc of a 360 degree rotation.

5. The harvesting assembly of claim 2 wherein the feed drum includes a first end portion, a second end portion, and a central portion disposed between the first end portion and the second end portion, the first end portion and the second end portion each including a flight.

6. The harvesting assembly of claim 5 wherein the first end portion and the second end portion each define a cone having a base portion, wherein the base portion of each cone is operatively connected to the central portion, wherein the central portion comprises a cylinder, wherein the cone includes a flight and the central portion includes a plurality of retractable fingers.

7. The harvesting assembly of claim 6 wherein each of the cones includes a single finger, the single finger extending from the cone and being inclined with respect to the drum axis.

8. The harvesting assembly of claim 7 wherein the single finger defines a longitudinal axis and the longitudinal axis is substantially perpendicular to a surface of the cone extending from the base portion of the cone to an end of the cone and along a surface of the cone.

9. The harvesting assembly of claim 2 further comprising a second side belt and a second side crop auger disposed at the second side belt, wherein the feed drum includes a first end portion, a second end portion, and a central portion disposed between the first end portion and the second end portion, wherein the first end portion and the second end portion overlap respectively a portion of the first side crop auger and a portion of second side crop auger, wherein the overlap is made along a plane extending from front edges of the first and second side belts to the feed drum, wherein the plane is generally perpendicular to a moving direction of the first and second side belts.

10. A draper header for harvesting a crop comprising:
    a cutting knife configured to cut crop;
    a draper platform including a first side draper, a second side draper, and a center draper disposed between the first side draper and the second side draper, the first and second side draper each including a draper belt having a front edge and rear edge, the front edge located closest to the cutting knife;
    a crop auger assembly including a first side auger disposed at the first side draper and a second side auger disposed at the second side draper, wherein each of the first side auger and the second side auger includes a cylinder having a surface, a flight extending from the surface, and a plurality of fingers extending from the surface, wherein the crop auger rotates about an auger axis, the first side auger and the second side auger each including a finger axis and a plurality of fingers that extend from the finger axis to a maximum extended position through the surface during rotation of the first and second side augers and retract to a retracted position through the surface during rotation of the first and second side augers, wherein the maximum extended position occurs at a predetermined degree of rotation of the first and second side augers wherein the predetermined degree of rotation is located between a horizontal plane and a vertical plane of the draper header; and
    a feed drum disposed at the center draper, the feed drum including a plurality of fingers, wherein the feed drum rotates about a drum axis.

11. The draper header of claim 10 wherein the feed drum includes a first end portion, a second end portion, and a central portion disposed between the first end portion and the second end portion, the first end portion and the second end portion each defining a cone having a base portion, wherein the base portion of each cone is operatively connected to the central portion, wherein the central portion comprises a cylinder, wherein the cone includes a flight and the central portion includes a plurality of retractable fingers.

12. The draper header of claim 11 wherein each of the cones includes a single finger, the single finger extending from the cone and being inclined with respect to the drum axis.

13. The draper header of claim 12 wherein the central portion lacks a flight.

14. The draper header of claim 10 wherein the fingers extend toward a front of the draper header when located in the horizontal plane and the fingers extend toward the side drapers in the vertical plane.

15. A method of harvesting a crop with a draper header having a side draper and a center draper disposed adjacently to the side draper, the method comprising:

provoding a crop auger having an axis of rotation, the crop auger disposed above the side draper, the crop auger including a flight spirally located about a cylinder, the flight having a leading edge, and a plurality of fingers extending from the cylinder;

providing a feed drum disposed above the center draper and having an end overlapping an end of the crop auger;

extending the fingers to a maximum extended position from a retracted position during rotation of the crop auger about the axis of rotation to compress the harvested crop located on the side draper, wherein the maximum extended position occurs between a predetermined portion of rotation located between a horizontal plane and a vertical plane of the draper header; and moving the compressed crop to the center draper with the side draper.

16. The method of claim 15 wherein the step of extending the fingers further includes extending the fingers past the leading edge of the flight during only the predetermined portion of about 90 degrees of the rotation of the crop auger.

17. The method of claim 16 wherein the step of extending the fingers includes extending the fingers to a maximum extension during the portion of the rotation when the fingers are located between a horizontal plane directed towards a front of the draper header and a vertical plane directed toward the draper belt.

* * * * *